US012732354B2

(12) United States Patent
Pettit et al.

(10) Patent No.: US 12,732,354 B2
(45) **Date of Patent: *Sep. 8, 2026**

(54) GENERATING SHARED CRYPTOGRAPHIC KEYS

(71) Applicant: nChain Licensing AG, Zug (CH)

(72) Inventors: Michaella Pettit, London (GB); Alexandru Paunoiu, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 72 days.

This patent is subject to a terminal disclaimer.

(21) Appl. No.: 18/689,794

(22) PCT Filed: Aug. 8, 2022

(86) PCT No.: PCT/EP2022/072210

§ 371 (c)(1),
(2) Date: Mar. 6, 2024

(87) PCT Pub. No.: WO2023/036528

PCT Pub. Date: Mar. 16, 2023

(65) Prior Publication Data

US 2024/0380581 A1 Nov. 14, 2024

(30) Foreign Application Priority Data

Sep. 7, 2021 (GB) ..................................... 2112721

(51) Int. Cl.
*H04L 9/08* (2006.01)
*H04L 9/14* (2006.01)
*H04L 9/32* (2006.01)

(52) U.S. Cl.
CPC ............ *H04L 9/0861* (2013.01); *H04L 9/085* (2013.01); *H04L 9/14* (2013.01); *H04L 9/3255* (2013.01)

(58) Field of Classification Search
CPC ......... H04L 9/0861; H04L 9/085; H04L 9/14; H04L 9/3255
See application file for complete search history.

(56) References Cited

U.S. PATENT DOCUMENTS 7,136,489 B1 11/2006 Madhusudhana et al.
9,673,975 B1 6/2017 Machani
(Continued)

FOREIGN PATENT DOCUMENTS

CN 105763333 A 7/2016
CN 113079003 A * 7/2021 ............. H04L 9/085
(Continued)

OTHER PUBLICATIONS

"Rosario Gennarto", "Stanislaw Jarecki", "Hugo Krawczyk", "Tat Rabin", "Robust Threshold Signatures" (Year: 1996).*
(Continued)

*Primary Examiner* — Darshan I Dhruv
(74) *Attorney, Agent, or Firm* — Galvani Smith PLLC; Rowan P. Smith

(57) ABSTRACT

A computer-implemented method of generating a share of a shared private key, wherein each participant of a group of participants has a respective share of a master private key, and wherein the method is performed by a first participant of the group and comprises: generating a first share of a first shared secret, wherein each other participant of the group generates a respective share of the first shared secret; and generating a first share of a first shared private key based on a first share of the master private key and the first share of the first shared secret.

17 Claims, 2 Drawing Sheets

(56) References Cited

U.S. PATENT DOCUMENTS

| | | | | |
|---|---|---|---|---|
| 9,800,411 | B1 * | 10/2017 | Brown | H04W 12/06 |
| 10,505,723 | B1 * | 12/2019 | Griffin | H04L 9/085 |
| 10,903,991 | B1 * | 1/2021 | Craige | H04L 9/085 |
| 2012/0121088 | A1 * | 5/2012 | Hata | H04L 9/085 380/255 |
| 2014/0281554 | A1 | 9/2014 | Maletsky et al. | |
| 2018/0212779 | A1 * | 7/2018 | Bergmann | H04L 9/3247 |
| 2020/0001456 | A1 | 1/2020 | Golz | |
| 2020/0074088 | A1 | 3/2020 | Fu | |
| 2020/0127829 | A1 | 4/2020 | Hsiao et al. | |
| 2021/0058233 | A1 * | 2/2021 | Lee | H04L 9/3247 |
| 2021/0073796 | A1 * | 3/2021 | Hennebert | G06Q 20/401 |

FOREIGN PATENT DOCUMENTS

| | | | | | |
|---|---|---|---|---|---|
| EP | 3741081 | A1 | | 11/2020 | |
| JP | H10200520 | A | | 7/1998 | |
| JP | 2000075788 | A | | 3/2000 | |
| JP | 2010272899 | A | * | 12/2010 | |
| JP | 2020043464 | A | | 3/2020 | |
| JP | 2020531893 | A | | 11/2020 | |
| JP | 2020532168 | A | | 11/2020 | |
| KR | 2020-0123029 | A | * | 10/2020 | H04L 9/0869 |
| TW | 1452889 | B | * | 9/2014 | |
| WO | 2017145016 | A1 | | 8/2017 | |
| WO | 2019034986 | A1 | | 2/2019 | |
| WO | WO-2019034951 | A1 | * | 2/2019 | H04L 9/3073 |
| WO | 2021073953 | A1 | | 4/2021 | |

OTHER PUBLICATIONS

"Steven Goldfeder", "Rosario Gennaro", "Harry Kalodner", "Joseph Bonneau", "Joshu A. Kroll", "Edward W. Felten", "Arivind Narayanan", "Securing Bitcoin wallets via a new DSA/ECDSA threshold signature scheme" (Year: 2015).*

"Steven Goldfeder", "Rosario Gennaro", "Harry Kalodner", "Joseph Bonneau", "Joshu A. Kroll", "Edward W. Felten", "Arivind Narayanan", "Securing Bitcoin wallets via a new DSA/ECDSA threshold signature scheme" (Year: 2015) (Year: 2015).*

GB2112719.6 Search Report dated Jan. 26, 2022 and Examination Report dated Jul. 11, 2023, 8 pages.

GB2112721.2 Search Report dated Jan. 28, 2022 and Examination Report dated Jul. 11, 2023, 7 pages.

Gennaro R et al., "Robust Threshold DSS Signatures", Advances in Cryptology—EUROCRYPT '96. International Conference on the Theory and Application of Cryptographic Techniques. Saragossa, May 12-16, 1996; [Advances in Cryptology—Eurocrypt. International Conference on the Theory and Application of C, May 12, 1996 (May 12, 1996), pp. 354-371, XP000725447, ISBN: 978-3-540-61186-8, sections 2-6.

PCT/EP2022/072210 International Search Report and Written Opinion dated Dec. 7, 2022, 12 pages.

PCT/EP2022/072273 International Search Report and Written Opinion dated Dec. 8, 2022, 13 pages.

Steven Goldfeder et al., "Securing Bitcoin wallets via threshold signatures", Jun. 3, 2014 (Jun. 3, 2014) XP055326412, Retrieved from the Internet: URL: http://www.cs.princeton.edu/~stevenag/bitcoin_threshold_signatures.pdf.

Steven Goldfeder et al: "Securing Bitcoin wallets via a new DSA/ECDSA threshold signature scheme", cs.princeton, Mar. 8, 2015 (Mar. 8, 2015), pp. 1-26, XP055318844, Retrieved from the Internet: URL: https://www.cs.princeton.edu/~stevenag /threshold_sigs.pdf.

Wuille, Pieter, "Hierarchical Deterministic Wallets", Github Bitcoin/bips, Feb. 11, 2012, github.com, URL: https://github.com/bitcoin/bips/blob/master/bip-0032.mediawiki.

Office Action for Japanese Patent Application No. 2024-514696, mailed Apr. 21, 2026, 12 pages.

* cited by examiner

GENERATING SHARED CRYPTOGRAPHIC KEYS

CROSS REFERENCE TO RELATED APPLICATIONS

This application is the U.S. National Stage of International Application No. PCT/EP2022/072210 filed on Aug. 8, 2022, which claims the benefit of United Kingdom Patent Application No. 2112721.2, filed on Sep. 7, 2021, the contents of which are incorporated herein by reference in their entireties.

TECHNICAL FIELD

The present disclosure relates to a method of generating shares of shared private keys. The shares may be used to generate shares of digital signatures, e.g. to sign blockchain transactions.

BACKGROUND

In general, a shared secret may be used to share a data item that is distributed amongst a group of participants. Each participant has a different share of the secret. Normally, the secret can only be reconstructed when a certain number (referred to as the "threshold") of participants make their respective shares available, e.g. to be combined together to calculate the secret.

Public-key cryptography is a type of cryptographic system that uses pairs of keys: private keys which are known only to the owner of the private key, and public keys which are generated based on the corresponding private key and which may be disseminated without compromising the security of the private key.

Public-key cryptography enables a sender to encrypt a message using a recipient's public key (i.e. the public key corresponding to a private key known only to the recipient). The encrypted message can then only be decrypted using the recipient's private key.

Similarly, a sender can use their own private key to sign a message, e.g. to prove that the message is being sent by the sender, and/or to indicate that the sender agrees with the message. The signer (i.e. the party generating the signature) uses their private key to create a digital signature based on the message. Creating a digital signature based on a message means supplying the message and private key to a function that generate the signature based on both the message and private key. The signature is added to (e.g. tagged onto) the message or otherwise associated with the message. Anyone with the signer's corresponding public key can use the same message and the digital signature on the message to verify whether the signature was validly created, i.e. whether the signature was indeed made using the signer's private key. As well as ensuring the authenticity of a message, digital signatures also ensure the integrity and non-repudiation of the message. That is, a digital signature can be used to prove that a message has not been changed since it was signed with the signature, and that the creator of a signature cannot deny in the future that they created the signature.

A digital signature scheme typically involves three procedures, i.e. algorithms. A key generation algorithm is used to generate a random private key and a corresponding public key. A signing algorithm is used to generate a signature based on a message and the private key. A verification algorithm is used to verify, given a public key and the message, whether the signature has been generated using the corresponding private key and according to the signing algorithm.

A common use of a shared secret is as a shared private key of a private-public key pair. That is, the private key may be distributed amongst a group of participants such that no single participant has access to the private key. Therefore no single participant can generate a valid signature of a message. Instead, some or all of the participants must together generate the private key in order for the signature to be generated.

Instead of the participants sharing their private key shares in order to generate a signature, they may instead use a threshold signature scheme. A threshold signature scheme allows a threshold number of participants in a group to create a digital signature based on a message using individual shares of a shared private key, without the private key being made available to any one participant. Here, a digital signature is a signature which is generated based on the message to be signed. In such a scheme, the signature can only be created if the threshold number of participants agree to generate the signature on the message. Any attempt to generate a signature using a smaller number of participants will not generate a valid signature. Therefore, a valid signature by the group (i.e. one generated using the message and the shared private key) provably had the threshold number of people agree to generate the signature. This also implies that any adversary needs to obtain the threshold number of shares of the private key to forge a signature with that private key.

SUMMARY

Cryptographic keys are typically used for authentication, authorisation, and encryption. For example, a cryptographic key can be used to create a secure communication channel between two parties, or to authorise a message such as a blockchain transaction. In each case, it is beneficial to generate new keys for each protocol execution, e.g. for each message to be authorised (i.e. signed). Similarly, it is recommended to avoid key reuse on public ledgers, such as the blockchain, for security and privacy reasons. Thus a party may require many keys. One technique for deriving keys is described in bitcoin improvement proposal (BIP) 32 standard, which enables deterministic asymmetric key derivation. Another technique for generating deterministic keys is described in international patent application WO2017/145016.

Both techniques derive keys from a master private key. However, by deriving deterministic keys from a master key, the loss or theft of the master key can lead to catastrophic results, such as loss of access to any digital assets controlled by the key. One method to mitigate against this single point-of-failure is to use threshold signatures. This enables signatures to be generated across multiple participants, as long as a threshold number of honest participants are involved.

It would be desirable to provide a novel technique for generating shares of shared private keys, which may be used for, amongst other things, generating threshold signatures. Shared private keys have a threshold, meaning that the private key can be generated if at least a threshold number of participants contribute a respective signature share. The same applies to threshold signature. This removes the single point-of-failure problem.

According to one aspect disclosed herein, there is provided a computer-implemented method of generating a share of a shared private key, wherein each participant of a group of participants has a respective share of a master private key, and wherein the method is performed by a first participant of the group and comprises: generating a first share of a first shared secret, wherein each other participant of the group generates a respective share of the first shared secret; and generating a first share of a first shared private key based on a first share of the master private key and the first share of the first shared secret.

The group of participants (e.g. users) each have a respective share of a master private key. The master private key is shared amongst the group in the sense that no individual participant has access to the master private key, but it is possible to generate the master private key if enough participants contribute their respective share. The number of participants required to generate the master private key is referred to as the threshold of the key.

The master private key may be used to encrypt messages (e.g. via threshold encryption) and to generate signatures (i.e. threshold signatures). However, there are scenarios where it is desirable to not use the master private key for encryption, signature generation, etc. Thus it is preferable to derive additional private keys that are based on the master private key. These derived keys are often referred to as child keys. To generate a first child key, the participants generate a shared secret (i.e. secret data, such as an integer). That is, each participant generates a respective share of the shared secret. Each participant then generates a respective share of a child private key as a function of their respective share of the master private key and their respective share of the shared secret. Many additional child keys may be derived in a similar way.

Thus the present disclosure provides a way of generating a structure of shared private keys, where each shared private key is deterministically derived from a shared master private key, allowing the shared private keys to be re-generated from the shared master private key and nonce value alone. The single point-of-failure problem is thus prevented.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

1. Cryptographic Preliminaries

Figure 1:
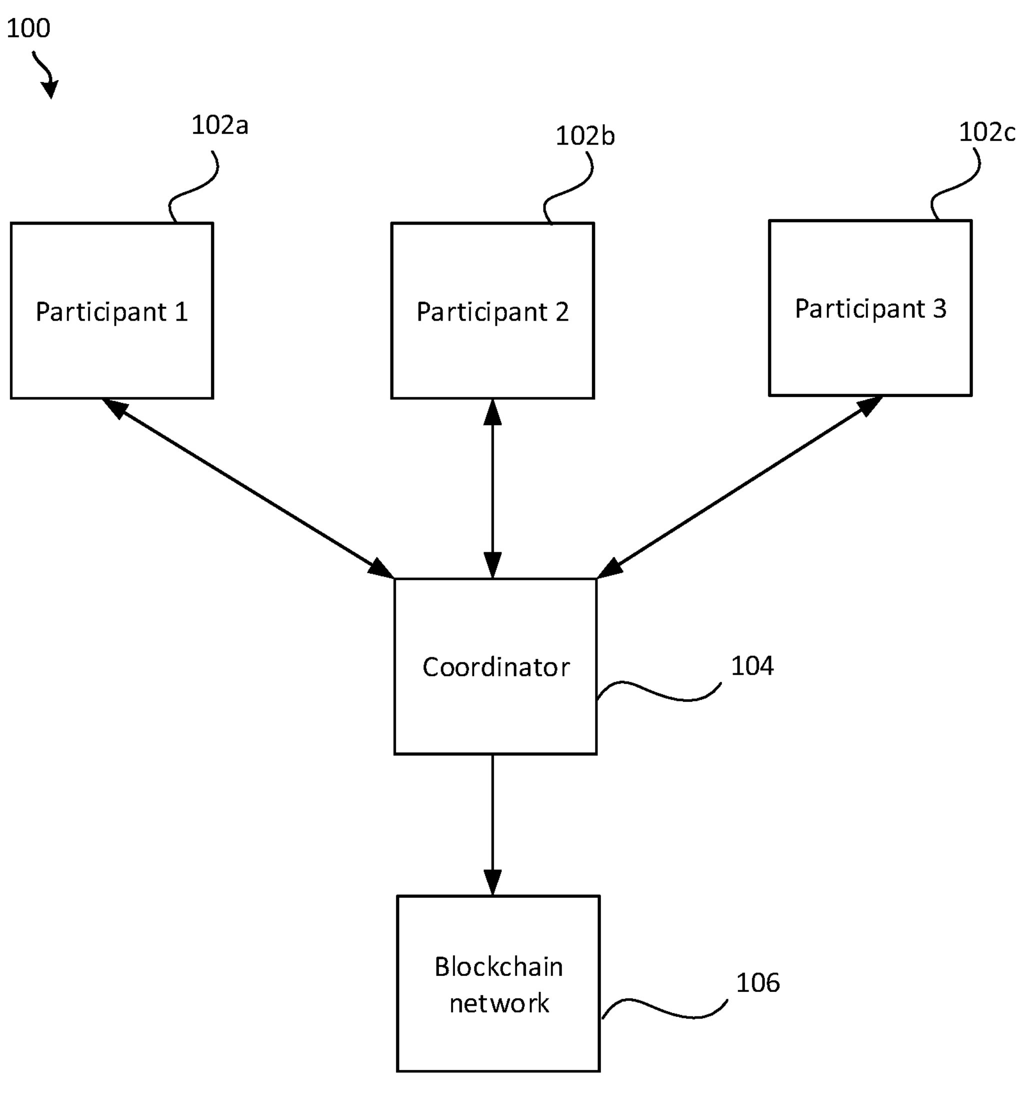
FIG. 1 is a schematic block diagram of a system for implementing embodiments of the present invention, and FIG. 2 schematically illustrates an example hierarchy of public keys obtained by a deterministic key derivation technique.

Whilst the following examples are described in terms of elliptic curve cryptography, the invention is not limited to any one particular cryptographic scheme and may in general be applied to any cryptographic scheme, e.g. RSA or other public key cryptography schemes.

1.1 Elliptic Curve Groups

An elliptic curve E satisfies the equation:

$$y^2 = x^3 + ax + b \bmod p$$

where $a, b \in \mathbb{Z}_p$ and a, b are constants satisfying $4a^3+27b^2 \neq 0$. The group over this elliptic curve is defined to be the set of elements (x,y) satisfying this equation along with the point at infinity $\mathcal{O}$, which is the identity element. The group operation on the elements in this group is called elliptic curve point addition and denoted by +. This group is denoted by $E(\mathbb{Z}_p)$ and its order by n.

This group operation can be used to define another operation on the elements called point multiplication denoted by ·. For a point $G \in E(\mathbb{Z}_p)$ and a scalar $$k \in \mathbb{Z}_n^*,$$

the point k·G is defined to be the point G added to itself k times.

In elliptic curve cryptography, a private key is defined to be a scalar $k \in \mathbb{Z}_n \setminus \{0\}$ where $\mathbb{Z}_n \setminus \{0\}$ is notation for the set $\{1, \ldots, n-1\}$, and the corresponding public key is the point k·G on an elliptic curve. For instance, in some blockchain protocols, the elliptic curve is chosen to be the secp256k1 elliptic curve, and the values a, b, and p are completely specified by this curve. The order n of this group has been calculated given these values, which in the case of this curve is a prime, and the secp256k1 standard also specifies a point G which is to be used as the generator of this group.

1.2 Elliptic Curve Digital Signature Algorithm

In order to create a signature on a message msg, with the private key a, the following steps are taken:

1. Calculate the message digest e=hash(msg), where may be any hash function. For instance, in some examples hash(msg)=SHA256(SHA256(msg)) where SHA256 (■) is the SHA-256 hash function. Note that instead the message may be hashed only once, or more that two times with the same or different hash functions.
2. Chose a random integer $k \in \{1, \ldots, n-1\}$, where n is the order of the elliptic curve, e.g. the secp256k1 curve. In the following, k is referred to as the ephemeral private key.
3. Calculate the ephemeral public key corresponding to this ephemeral private key $k \cdot G = (R_x, R_y)$.
4. Calculate $r = R_x \bmod n$. If r=0, return to step 2.
5. Calculate the multiplicative inverse of the ephemeral key $k^{-1} \bmod n$.
6. Calculate $s = k^{-1}(e+ar) \bmod n$. If s=0, return to step 2.
7. The signature on the message msg is (r,s).

The ephemeral key must be kept secret, otherwise the private key can be calculated, given a message and signature. Additionally, each time a signature is generated, a different ephemeral key must be used. If this is not the case, it is possible to derive the private key a given two different signatures and their corresponding messages.

Given a message msg, a public key P=a·G, and corresponding signature (r,s), then one can verify the signature by completing the following steps:

1. Calculate the message digest e=hash(msg), e.g. e=SHA256 (SHA256 (msg)).
2. Calculate the multiplicative inverse $s^{-1}$ of s modulo n.
3. Calculate $j_1 = es^{-1} \bmod n$ and $j_2 = rs^{-1} \bmod n$.
4. Calculate the point $Q = j_1 \cdot G + j_2 \cdot P$.
5. If $Q = \mathcal{O}$, the point at infinity, the signature is invalid.
6. If $Q + \mathcal{O}$, then let $Q == (Q_x, Q_y)$, and calculate $u = Q_x \bmod n$. If u=r, the signature is valid.

In threshold signature schemes, this private key a is split into key shares that are distributed amongst participants in a threshold scheme group.

1.3 Joint Verifiable Random Secret Sharing

Assume that N participants want to create a joint secret that can only be regenerated by at least (t+1) of the participants in the scheme. To create the shared secret, the following steps are taken:

1. The participants agree on the unique label i for each participant. Each participant i generates (t+1) random numbers $$a_{ij} \in_R \mathbb{Z}_n \setminus \{0\}, \forall j = 0, \ldots, t,$$

where $\in_R$ means a randomly generated element of the set $\mathbb{Z}_n \setminus \{0\}$ where $\mathbb{Z}_n \setminus \{0\}$ is notation for the set $\{1, \ldots, n-1\}$. Then each participant has a secret polynomial of order t $$f_i(x) = a_{i0} + a_{i1}x + \ldots + a_{it}x^t \mod n,$$

for i=1, . . . , N. Note that we omit the mod n notation from now on, and it is assumed that all arithmetic operations over integers are done modulo n.

2. Each participant i sends the value $f_i(j)$ to participant j e.g. using a secure communication channel with participant j only.
3. Each participant i calculates their own private secret share of a shared secret polynomial as $$a_i := \sum_{j=1}^{N} f_j(i).$$

A shared secret share is a point with the form $(i, a_i)$, where i is the participants label in the scheme. This method for creating a secret share of a, as described in steps 1-3, is denoted herein by adi=JVRSS(i) for participant i. Note that "JVRSS" typically stands for "Joint verification random secret sharing" and includes steps 4 and 5 as well. However, throughout this document JVRSS is taken to mean performing at least steps 1 to 3, where steps 4 and 5 are optional steps.

Now that the participants have generated a shared polynomial, they can each verify that the other participants have shared the correct information to all participants, and that all participants have the same shared polynomial. This is done in the following way.

4. Each participant i broadcasts to all participants the obfuscated coefficients $$a_{ik} \cdot G, \text{ for } k = 0, \ldots, t.$$

5. Each participant i checks that each participant j has correctly calculated the polynomial point $f_j(i)$ by calculating $f_j(i) \cdot G$ and verifying that $$f_j(i) \cdot G \stackrel{?}{=} \sum_{k=0}^{t} i^k (a_{jk} \cdot G) \ \forall\, j = 1, \ldots, N.$$

If all participants find that this equation holds for each polynomial, then the group can collectively be sure that they have all created the same shared polynomial.

1.4 Reconstructing a Shared Secret

Assume a participant wants to reconstruct a shared secret a which is the zeroth order of a shared polynomial. Given (t+1) points on this polynomial of the form $$(1, a_1), \ldots, ((t+1), a_{t+1}),$$

then to find the shared secret a, one calculates $$\text{interpolate}(a_1, \ldots, a_{t+1}) = \left( \sum_{l=1}^{t+1} a_l \prod_{\substack{1 \le j \le (t+1), \\ j \ne l}} (-j)(l-j)^{-1} \right) = a,$$

which is derived from a general formula known as "Lagrange Interpolation".

1.5 Public Key Calculation

Given the N zeroth-order private polynomial coefficient public keys $a_{i0} \cdot G$ for j=1, . . . , N shared in step 4 of JVRSS, each participant calculates the shared public key P using $$P = a \cdot G = \sum_{j=1}^{N} a_{j0} \cdot G,$$

corresponding to the shared secret a.

1.6 Addition of Shared Secrets

To calculate the addition of two shared secrets that are shared amongst a group of N participants, where each secret polynomial has order t, without any entity knowing the individual secrets, the following steps are taken:

1. Generate the first shared secret a, where participant i's share is given by $a_i$=JVRSS(i) for i=1, . . . , N with a threshold of (t+1).
2. Generate the second shared secret b, where participant i's share is given by $b_i$=JVRSS(i), with a threshold of (t+1).
3. Each participant i calculates their own additive share $$v_i = a_i + b_i \mod n.$$

4. All participants broadcast their additive share $v_i$ to all other participants.
5. Each participant interpolates over at least (t+1) of the shares $v_i$ to calculate (08052383/1)

$$v = \text{interpolate}(v_1, \ldots, v_{t+1}) = a + b.$$

This method for the addition of shared secrets is denoted by ADDSS(i) for participant i, which results in each participant i knowing v=(a+b).

1.7 Product of Shared Secrets

To calculate the product of two shared secrets that are both shared amongst a group of N participants, where each secret polynomial has order t, the group takes the following steps:

1. Generate the first shared secret a, where participant i's share is given by $a_i$=JVRSS(i) for i=1, . . . , N. The shared secret polynomial has order t, meaning (t+1) participants are required to recreate it.
2. Generate the second shared secret b, where participant i's share is given by $b_i$=JVRSS(i), and the shared secret polynomial again has order t.
3. Each participant calculates their own multiplicative share $\mu_i$ using $$\mu_i = a_i b_i.$$

4. All participants broadcast their multiplicative share $\mu_i$ to all other participants.
5. Each participant interpolates over at least (2t+1) of the shares $\mu_i$ at 0 to calculate $$\mu = \text{interpolate}(\mu_1, \ldots, \mu_{2t+1}) = ab.$$

This method for calculating the product of two shared secrets is denoted herein by u=ab=PROSS(i) for participant i.

1.8 Inverse of a Shared Secret

In order to calculate the inverse of a shared secret a, the following steps are taken:

1. All participants calculate the product of shared secrets PROSS(i), the result of which is μ=ab mod n.
2. Each participant calculates the modular inverse of μ which results in $$\mu^{-1} = (ab)^{-1} \bmod n.$$

3. Each participant i calculates their own inverse secret share by calculating $$a_i^{-1} = \mu^{-1} b_i.$$

This method for calculating the inverse of shared secrets is denoted by $$a_i^{-1} = INVSS(i)$$

for participant i.

1.9 Shared Private Key Generation and Verification

To calculate a shared private key a between N≥2t+1 participants, t+1 of which are required to create a signature, the participants execute JVRSS with a threshold of t+1 and public key calculation as described above. The result is that every participant i=1, . . . , N has a private key share a; and the corresponding shared public key P=(a·G).

1.10 Ephemeral Key Shares Generation

To generate ephemeral key shares and the corresponding r, as is required in a signature, a group of size N with a shared private key a of threshold (t+1) execute the following steps:

1. Generate the inverse share of a shared secret $$k_i^{-1} = INVSS(i),$$

where (t+1) shares are required to recreate it.

2. Each participant calculates $$(x, y) = \sum_{i=1}^{N} (k_{i0} \cdot G),$$

using the obfuscated coefficients shared in the verification of $k_i$, then they calculate $$r = x \bmod n.$$

3. Each participant i stores $$(r, k_i^{-1}).$$

1.11 Non-Optimal Signature Generation

Assume that at least 2t+1 participants would like to create a signature on a message, and one of the participants chooses to coordinate this. In order to create a signature by a group with the shared private key a, the following steps are taken.

1. The coordinator requests a signature on the message from at least 2t+1 participants.
2. Each participant i recovers the ephemeral key $$(r, k_i^{-1})$$

calculated in the previous section. All users must use a share corresponding to the same ephemeral key.

3. Each participant calculates the message digest e=SHA-256 (SHA-256 (message)).
4. Each participant i calculates their own signature share $s_i$:

$$s_i = k_i^{-1}(e + a_i r) \bmod n,$$

where $a_i$ is their private key share.

5. Each participant sends their signature share (r,$s_i$) to the coordinator.
6. When the coordinator has received 2t+1 signature shares, they calculate:

$$s = \text{interpolate}(s_1, \ldots, s_{2t+1}),$$

and output the signature as (r,s).

7. The coordinator verifies the signature using the standard ECDSA verification. If this fails, at least one of the shares must be incorrect, and the signature generation algorithm should be run again.

1.12 Addition of Secrets with Different Thresholds

In the case of addition of secrets of order t and t', the addition of the two secrets requires max(t,t')+1 number of shares to calculate it. The reason behind this is that the addition step of the shares of the shared secrets creates a share of a new polynomial. This new additive polynomial is equivalent to the result of the addition of the individual polynomials of the two shared secrets. Adding two polynomials is adding the corresponding coefficients at each order of x. Therefore, the order of the additive polynomial must be the same order as the highest order of the two polynomials. This can be generalised to the addition of more than two polynomials, where the order of the resulting polynomial is the same as the order of the highest order individual polynomial.

Once the addition of two secrets with different thresholds has been calculated, the security of the higher threshold secret is reduced. This is because if one now knows the result (a+b) with respective thresholds t, t' and assume that t<t', then one can calculate a with t shares, and then calculate (a+b)−a=b, and so the value b has been calculated with only t shares. This lower threshold is referred to below as the 'implicated threshold' of b.

1.13 Multiplication of Secrets with Different Thresholds

In the case of multiplication of two secrets with a threshold of t and t', the calculation of the multiplication requires t+t'+1 shares. In this case, the multiplication of shares of two polynomials results in a share on a new polynomial. This new polynomial is the result of multiplying the two individual polynomials and so the order of the result is the addition of the order of the two individual polynomials.

Multiplication can also be generalised to any number of shared secrets, with the resulting threshold being the sum of the individual thresholds plus 1, $\Sigma_\rho t_\rho+1$, where ρ runs over the individual shared secrets.

Similar to addition, the multiplication of two secrets with different thresholds results in an implicated threshold of the higher threshold secret. As before, if ab is known where a has a threshold of t and b has a threshold of t', and t<t', then both a and b can be calculated with t shares. First, one can calculate a and using $(ab)a^{-1}$ find b with only t shares of a secret.

1.14 Combining the Addition and Multiplication of Shared Secrets in One Step

It is possible to generalise the above to calculate any combination of addition and multiplication in one step. Assume a group of N participants want to calculate the result ab+c, where a, b, c are shared secrets with thresholds $(t_a+1)$, $(t_b+1)$, $(t_c+1)$ respectively. There is a condition which is max $(t_a+t_b, t_c)<N$, that is, the number of participants of the scheme must be greater than the maximum between the order of the secret c and the order of the result of the multiplication of the secrets a and b.

1. Each participant i calculates their secret shares $a_i$=JVRSS(i), $b_i$=JVRSS(i), $c_i$=JVRSS(i) with thresholds $(t_a+1)$, $(t_b+1)$, $(t_c+1)$ respectively.
2. Each participant i calculates the share $\lambda_i=a_ib_i+c_i$.
3. Each participant i shares the result $\lambda_i$ with the other participants.
4. Each participant interpolates over max $(t_a+t_b, t_c)+1$ shares to find the result $\lambda=\text{int}(\lambda_1, \ldots, \lambda_i, \ldots)=ab+c$.

This is done in the calculation of a shared signature according to some embodiments below. That is, there is an interpolation over $$s_i=k_i^{-1}(e+a_ir).$$

This is essentially the case above with $$a_ib_i=k_i^{-1}a_ir$$

and $$c_i=k_i^{-1}e.$$

In this case $t_a+t_b=2t$ and $t_c=t$, and interpolation is over max $(t_a+t_b, t_c)+1=2t+1$ shares.

1.15 Shamir's Secret Sharing Scheme (SSSS)

SSSS is a method to split a piece of data $a_{i0}$ into N shares, such that the secret has a threshold of t, requiring t+1 shares to recreate the secret $a_{i0}$. A dealer i randomly generates t integers $a_{i1}, \ldots, a_{it}$ and defines a degree-t polynomial $$f_i(x)=a_{i0}+a_{i1}x+\ldots+a_{it}x^t \bmod p.$$

Each jth share is defined as $(j, a_j=f_i(j))$, where j=1, . . . , N.

1.16 Deterministic Key Derivation

WO2017/145016 describes a method to generate multiple common secrets between two parties from asymmetric keys that may be used for symmetric encryption. The key derivation method focuses on the asymmetric key derivation to be used as required, such as generating symmetric encryption keys or for creating a signature.

Assume Alice has a master private key m with a corresponding public key $P_M$. In order to derive a child key, she chooses a nonce value nonce and derives a child private key as $$a_{(1)}=m+hash(nonce)$$

where hash is a cryptographic hash function, and the corresponding public key is $$P_{A_{(1)}}=a_{(1)}\cdot G=P_M+hash(nonce)\cdot G.$$

Figure 2:
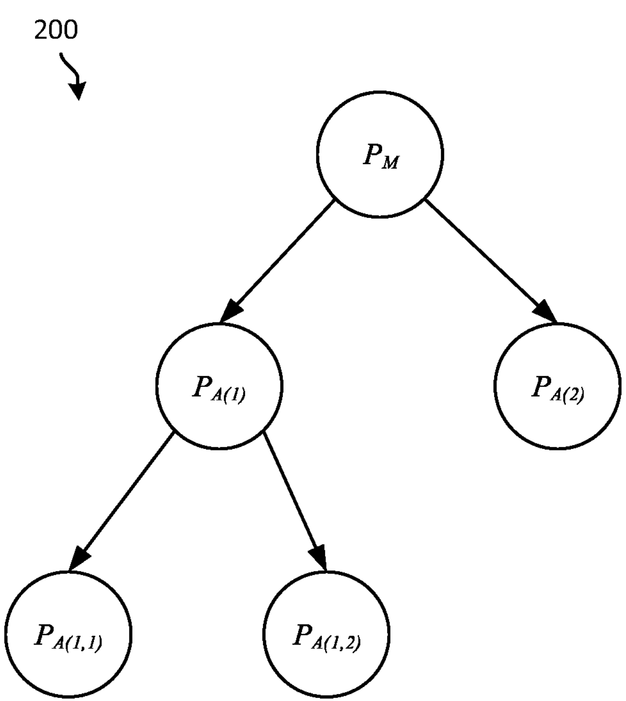

Alice can further derive the private child key $a_{(2)}$=m+hash(hash(nonce)) with corresponding public key $$P_{A_{(2)}}=a_{(2)}\cdot G=P_M+hash(hash(nonce))\cdot G$$

and can continue by successively hashing the previous hash digest to generate further keys. Alice can enable a tree-like structure of derived keys. An example is shown in FIG. 2.

Each branch of the tree can be used for different purposes. In the example of FIG. 2, Alice uses a child key as the parent to derive branches such as $$P_{A_{(1,1)}} = P_{A_{(1)}} + hash(nonce) \cdot G$$

Alice constructs a sibling of $P_{A_{(1,1)}}$ by using $P_{A_{(1)}}$ as the master branch:

$$P_{A_{(1,2)}} = P_{A_{(1)}} + hash(hash(nonce)) \cdot G.$$

In WO2017/145016 these keys are combined with Bob's key to derive symmetric keys for communication.

2. Generating Shared Private Keys

FIG. 1 illustrates an example system 100 for implementing embodiments of the invention. As shown, the system 100 comprises a plurality of parties (also referred to herein as "participants") 102. Only three participants 102*a*, 102*b*, 102*c* are shown in FIG. 1, but it will be appreciated that in general the system may comprise any number of participants. The system 100 may also comprise a coordinating party 104 (or simply, "coordinator"), who may or may not also be one of the participants 102. Each of the participants 102 and the coordinating party 104 operates respective computing equipment.

Each of the respective computing equipment comprises respective processing apparatus comprising one or more processors, e.g. one or more central processing units (CPUs), accelerator processors such as graphics processing units (GPUs), other application specific processors, crypto-processors, digital signal processors (DSPs), and/or field programmable gate arrays (FPGAs). The respective computing equipment may also comprise memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive. The respective computing equipment may comprise at least one user terminal, e.g. a desktop or laptop computer, a tablet, a smartphone, or a wearable device such as a smartwatch. Alternatively or additionally, the respective computing equipment may comprise one or more other networked resources, such as cloud computing resources accessed via the user terminal (the cloud computing resources comprising resources of one or more physical server devices implemented at one or more sites). It will be appreciated that any act described as being performed by a party of the system 100 may be performed by the respective computing apparatus operated by that party.

Each of the participants 102 may be configured to transmit data to one, some or all of the other participants 102 over a network such as the Internet using a LAN or WAN connection, or via alternative wired or wireless communication means. Unless the context requires otherwise, reference to a participant 102 transmitting data may be understood as transmitting data to other participants 102 individually, e.g. via a secure communication channel between the first participant 102*a* and the second participant 102*b*, or broadcasting to the group as a whole, e.g. via email or other means. Again, unless the context requires otherwise, each participant 102 may transmit data in raw form, or in encrypted form. For instance, the data may be encrypted using a public key of a recipient participant before being sent to that recipient participant. The same applies to the coordinator 104 transmitting and receiving data to one, some or all of the participants 102.

Embodiments of the present invention will primarily be described from the perspective of the first participant 102*a*. However it will be appreciated that in general steps of the described method may similarly be performed by other participants, e.g. the second participant 102*b* or third participant 102*c*. It will also be appreciated that the terms "first", "second", "third" and so on are used herein merely as distinguishing labels and do not necessarily imply an order, unless the particular context in which the terms are used requires otherwise.

The present invention enables each participant 102 of a group of participants 102 to generate respective shares of shared private keys. Each shared private key is linked to a shared master private key, where each participant 102 has a respective share of the shared master private key. That is, each participant 102 has access to (e.g. stores in memory of their respective computing equipment) a respective share of the shared master private key. These private key shares may be generated using a secret sharing scheme such as, for example, JVRSS (described above) or Shamir's Secret Sharing Scheme (SSSS). Alternative schemes for generating shares of a shared private key may be used. The shared master private key has a threshold, i.e. the private key can only be successfully generated based on at least the threshold number of different private key shares.

The present disclose provides techniques for generating child private keys shares (i.e. shares of child private keys) based on the master private key shares. To do so, the participants derive a first shared secret. That is, each participant 102 calculates a respective share of a first shared secret. The first shared secret (i.e. the shares thereof) may be generated using JVRSS, SSSS, or a similar scheme for generate secret shares. Shares of a first child private key are then generated based on (i.e. as a function of) the shares of the master private key and the shares of the first shared secret. That is, the first participant 102*a* generates a first share of the first child private key based on a first share of the master private key and a first share of the first shared secret, the second participant 102*b* generates a second share of the first child private key based on a second share of the master private key and a second share of the first shared secret, and so on.

In some examples, the first participant 102*a* generates the first share of the first child private key based on an addition of the first master private key share and the first share of the first shared secret. If the threshold of the first shared secret is chosen to be the same as the threshold of the master private key, this results in the threshold of the first child private key being the same as the threshold of the master private key. If the threshold of the first shared secret is chosen to be greater than the threshold of the master private key, this results in the threshold of the first child private key being greater than the threshold of the master private key.

In other examples, the first participant 102*a* generates the first share of the first child private key based on a multiplication of the first master private key share and the first share of the first shared secret. Regardless of whether the operation is addition, multiplication, or otherwise, the same operation is used by each participant. If the threshold of the first shared secret is chosen to be the same as the threshold of the master private key, this results in the threshold of the first child private key being greater than the threshold of the master private key. If the threshold of the first shared secret is chosen to be greater than the threshold of the master private key, this also results in the threshold of the first child private key being greater than the threshold of the master private key.

The participants 102 may generate a public key corresponding to the first child private key. One participant may do this on behalf of the others, or they may cooperate to generate the public key. Each participant 102 has access (e.g. stores in memory) to a master public key corresponding to the shared master private key. The participants generate a public key corresponding to the first shared secret ("first public key"). The public key may be generated as described in section 1.15 above if the first shared secret is generated using JVRSS. If the shared secret is generated using SSSS then a coordinator 104 may provide each participant with the public key. It is within the remit of the skilled person to generate a public key corresponding to a shared secret. A first child public key corresponding to the first child private key is then generated based on the master public key and the first public key, e.g. based on elliptic curve addition of the master public key and the first public key.

The participants 102 may generate shares of a second child private key, i.e. their own share of the second child private key. The second child private key shares may be generated based on the master private key shares and shares of a second shared secret. Each participant 102 generates a respective share of a second shared secret, e.g. using JVRSS, SSSS, or a different scheme for generating secret shares. The second shared secret is different from the first shared secret, which ensures that the first and second child private keys are different. The participants 102 may generate a second public key corresponding to the second child private key based on the master public key and a public key corresponding to the second shared secret.

The participants 102 may generate shares of a third child private key, i.e. their own share of the third child private key. The third child private key shares may be generated based on shares of a different child private key private shares (e.g. those of the first child private key or the second child private key) and a third shared secret. As before, each participant 102 generates a respective share of the third shared secret, e.g. using JVRSS. However in this case the respective shares of the third child private key are not directly based on the master private key, but rather a different child private key. The third shared secret may be the same as the first shared secret or the second shared secret, or it may be different to both the first and second shared secrets. The participants 102 may generate a third public key corresponding to the third child private key. The third public key is based on the public key corresponding to the child key upon which the third child key is based, e.g. the first child key, and also a public key corresponding to the third shared secret.

By deriving child private key shares based on previously derived child private key shares, a tree-like key structure like the one shown in FIG. 2 may be generated. For instance, a grandchild key share ($P_{A(1,1)}$) may be generated based on child key share ($P_{A(1)}$). Similarly, another grandchild key share ($P_{A(1,2)}$) may be generated based on the same child key share ($P_{A(1)}$) by using different shared secrets to derive the keys. Many more levels of the tree may be generated in this way.

In some embodiments, the first child private key may be used for e.g. generating signatures, encrypting data, etc. In other embodiments, the first child private key is an intermediate private key that is used to derive another child private key, where that other child private key is used for signation generation, encryption, etc. In these examples, shares of this intermediate private key are generated based on shares of the master private key and shares of the first shared secret, as discussed above. In addition, the shares of the first child intermediate key are generated based on another shared secret (referred to as a "fourth shared secret"). For instance, the first participant generates a first share of the intermediate private key based on a first share of the master private key, a first share of the first shared secret, and a first share of the fourth shared secret. As a particular example, the first share of the master private key and the first share of the first shared secret may be combined by multiplication, with the first share of the fourth shared secret being added to the result.

Each participant 102 then sends their respective share of the intermediate private key to the other participants 102. The intermediate private key may thus be reconstructed, and hence why in these embodiments it is not used for signing, etc. The participants reconstruct the intermediate private key using the shares of the intermediate private key, e.g. by interpolating over at least the threshold number of shares. Each participant then generates a respective share of a fourth child private key based on the intermediate private key and their respective share of the fourth shared secret. Note that the fourth shared secret is not known to the participants. As an example, the first share of the fourth private key may be the subtraction between the intermediate private key and the first share of the fourth shared secret. The fourth child private key may then be used for signature generation, etc.

When the threshold of the first shared secret and the fourth shared secret are chosen to be the same as the threshold of the master private key, the effect is that the threshold of the intermediate private key is greater than the threshold of the master private key and the resulting fourth child private key. This means that more participants are needed in order to derive shares of the fourth child private key than are needed to generate a signature using the fourth child private key. In other words, fewer participants are needed to sign than to derive the signing key. As an example use case, this may be used to set up a joint bank account between multiple (e.g. three) users, where only a subset (e.g. one or two) of the users are required in order to authorise transactions. As another example, four users may sit on the board of a company. All four board members may be required to set up the signing key, but only any two of the board members may be required to make decisions, where a decision can only be made by signing a document, for example.

Threshold signatures have been briefly described above. The participants may use any of the derived child private keys (e.g. the first, second, third or fourth child private key) to generate respective shares of a threshold signature, e.g. a threshold ECDSA signature. The threshold signature may be optimal or non-optimal, meaning that the threshold of the signature may be the same as the child private key or different. For instance, each participant (or at least a threshold number) may generate a respective share of a first signature using their respective share of the first child private key. Similarly, respective shares of a second signature may be generated using respective shares of the second child private key. In these examples, at least the threshold number of participants 102 make their respective signature available to the coordinator 104 for generating a signature. The participants 102 may have access to the message to be signed, or they may receive the message from the coordinator 104. As is discussed further below, one or more of the messages to be signed may be blockchain transactions.

Each participant may generate a respective signature share based on (i.e. is a function of) at least a respective share of a child private key, e.g. a first share of the first child private key. In some embodiments, the signature share is also generated based on a first ephemeral key share (or more specifically, the inverse thereof), a first co-ordinate of the ephemeral public key (or more specifically, the first co-ordinate mod n, where n is the order of the elliptic curve).

The following provides an example method which may be used by the participants 102 for generating a threshold signature. Steps S401 to S408 are performed by each of a threshold number of participants 102 in this example (including the first participant 102_a_). Step S409 is performed by a coordinator 101, who may also be one of the participants performing steps S401 to S408. It will be appreciated that some of the steps may be omitted or be performed in a different order.

The example method enables the creation of a shared secret of threshold (t+1) in a group of $N \geq 2t+1$ participants, where the signing threshold is also (t+1).

Set-Up:

In step S401, each participant 102 calculates a shared private key share a; (e.g. the first, second, third or fourth child private key) and a corresponding public key. The private key share is generated as described above. At this point, each participant i has a secret key share and public key ($a_i$, P), where P is notation for the public key corresponding to the shared private key. The shared private key has a threshold of (t+1).

Pre-Calculation:

In step S402, each participant 102 calculates a shared ephemeral key share and a corresponding public key. For instance, each participant 102 may calculate a shared ephemeral key using JVRSS and the calculation of the public key given in the preliminaries. Each participant 102 may then calculate an inverse share based on the ephemeral private key. This results in each participant having an inverse share $$(k_i^{-1}, r),$$

with a threshold of (t+1).

In step S403, each participant 102 creates two different shared blinding key shares. For instance, each participant 102 may create two shared secrets so that participant i has shares $\alpha_i$=JVRSS(i) and $\beta_i$=JVRSS(i), each shared secret having a threshold (t+1). Note that in some examples, not all of the shared secrets need to have the same threshold.

In step S404, each participant 102 calculates an intermediary share and broadcasts their intermediary share to the other participants. For instance, each participant i may calculate the intermediary share $$\lambda_i = k_i^{-1} a_i r + \beta_i.$$

This value has a threshold of (2t+1).

In step S405, the first participant 102_a_ calculates an intermediary value based on at least the intermediary shares. For instance, the first participant 102_a_ may calculate the intermediary value using interpolation over (2t+1) shares $\lambda$=interpolate $(\lambda_1, \ldots, \lambda_{2t+1}) = k^{-1}ar+\beta$.

In step S406, the first participant 102_a_ has knowledge of $$(r, k_i^{-1}, \lambda, \beta_i)$$

and stores this along with the private key share and corresponding public key ($a_i$,P).

Note that since a different ephemeral key is used for each signature, multiple ephemeral keys can be set up at one time, that is, steps S402 to S406 can be repeated to create multiple ephemeral keys during pre-calculation and stored for later use. These can be executed at the same time so that there are no additional rounds of communication. Note that preferably, a different value of $\alpha$ and $\beta$ should be used for each signature.

Signature Generation:

In order to sign a message msg, at least (t+1) participants must perform steps S407 and S408. In step S407, at least the threshold number of participants 102 obtain a message to be signed and calculate a message digest. For instance, a coordinator 101 may send a request to (t+1) participants to create a signature share on the message msg. Each participant i may calculate the message digest e=hash(msg). In some examples, this hash function is the double SHA-256 hash function. Alternative hash functions may be used.

In step S408, at least the threshold number of participants 102 calculate a signature share and send it to the coordinator 101. For instance, each participant i may calculate their signature share $$s_i = k_i^{-1} e - \beta_i,$$

and then send this signature share ($r, s_i$) to the coordinator. Note that the value r may not be sent by all participants.

In step S409, the coordinator 101 calculates the signature. For instance, the coordinator 101 may calculate s=interpolate $(s_1, \ldots, s_{t+1}) + \lambda = k^{-1}e + k^{-1}ar$, and finally the signature (r,s). This results in the expected signature share since the $\beta$ terms cancel. Similar variations of this protocol can be made as above describing when the $(ka)^{-1}$ and r is included in the calculation.

Note that the thresholds of the secrets may be different. That is the threshold of a,k,$\alpha$,$\beta$ themselves do not necessarily need to be the same to execute the signature generation scheme. For example, if there is a group of six and three are needed to create the signature and/or private key, they could technically do the calculation with the threshold of the k being four and the thresholds of the other shared secrets being three, and they will still have a threshold-optimal scheme.

Some embodiments of the present invention can be used to generate a signature on any message. As a particular example use case, as shown in FIG. 1, the message may be part or all of a blockchain transaction. That is, the signature may be used to sign one or more inputs and/or one or more outputs of a blockchain transaction. For instance, the generated signature may be used, at least in part, to unlock an output of a blockchain transaction. As a particular example, the output of a previous transaction may be a pay-to-public-key-hash (P2PKH) output which is locked to a hash of a public key. In order to be unlocked, an input of a later transaction that references the P2PKH output needs to include the (unhashed) public key and a signature generated based on the private key corresponding to the public key.

The coordinator 104 may sign the blockchain transaction and submit the signed transaction to one or more blockchain nodes of a blockchain network 106.

Represented in script, the "locking script" and "unlocking script" may take the following forms:

Locking script=OP_DUP OP_HASH160<Public KeyHash>OP_EQUAL OP_CHECKSIG Unlocking script=<Signature><Public Key>

Referring to the above described embodiments, the <Public Key> may be equated to $P=a_{child}\cdot G$, and the <Signature> comprises the threshold signature s, where the previous transaction is the message to be signed. Note that as stated above, ECDSA signatures are in the form (r,s).

Note that the described signature generation method is not limited to any particular use case and may in general be used for generating a signature based on any message. Signing all or part of a blockchain transaction is just one illustrative example. The described method may be used to sign and/or authorise, for instance, a legal document (e.g. a will, deed or other contract), correspondence between one or more parties, digital certificates (e.g. issued by a certificate authority), medical prescriptions, a bank transfer or a financial instrument, a mortgage or loan applications, etc.

As a particular example, the group of participants (say five participants in total) may form the board of a company. Voting matters of the company may require a majority of the board (i.e. at least three participants) to agree on the particular vote. The board may use the described signature generation method to prove that at least three board members agreed to vote in favour of a particular outcome. In this example, the threshold of the signature generation scheme is three. That is, at least three of the board members must provide a respective signature share in order for the coordinator to successfully generate a signature. If a signature is generated successfully, at least the threshold number (i.e. three) of board members must have agreed to vote in favour of that outcome. Thus the successful generation of a signature acts as a record of the vote and proves that a majority of the board voted in a particular way.

Another use case for the present invention lays in the field of digital certificates, e.g. digital certificate issued by the X.509 standard. A digital certificate contains a signature that signs over some data. The data can in general be any data, but one particular example of data included in a digital certificate is a public key. A public key in a digital certificate is often referred to as a "certified public key". The issuer of the digital certificate (a "certificate authority") may perform one or more checks on the owner of the public key (e.g. know-your-customer checks), and if the checks are successful, the certificate authority issues a digital certificate that includes the certified public key. A user can use a certified public key to prove they are who they say they are, e.g. by signing a message with a private key corresponding to the certified public key. One particular use for certificate authorities is to sign certificates used in HTTPS for secure browsing on the internet. Another common use is in issuing identity cards by national governments for use in electronically signing documents. The certificate authority signs the public key (or any other data to be attested to) using a private key.

As stated above, embodiments of the present invention may involve encrypting a message with a public key corresponding to a private key share, and similarly decrypting the message with a private key share. In that case, the first participant 102*a* may decrypt the message that has been encrypted by a different party. As another option, a message may be encrypted with a public key corresponding to a full private key, e.g. a full child key. In that case, at least a threshold number of participants may make their respective shares of the child private key available in order to decrypt the message. The message that is encrypted may comprise some or all of a blockchain transaction, e.g. encrypted data may be included in a transaction to be recorded on the blockchain.

3. Example Use Case

The following provides a specific example of the described embodiments,

Assume there are N parties who want to set up a shared secret with threshold t. All participants set up a group master key m e.g. using JVRSS, resulting in each party i having a share $m_i$. The associated public key is $P_M=mG$. Parties can construct m through the interpolation of at least t+1 secret shares.

One of the disclosed child key derivation methods is to add a second randomly generated value to the parent key, which easily enables flexibility in the child key threshold, as described later. Assume N participants have executed the setup protocol to create the shared secret m. The steps to derive the first child private key from the shared secret m are the following:

1. Parties generate a shared secret α through the JVRSS protocol of threshold t, with associated public key $P_\alpha=\alpha G$. Each party i has knowledge of their secret share $\alpha_i$ derived from JVRSS.
2. Each party i computes $a_i=m_i+\alpha_i$.

The first child private key is then the shared secret $a=m+\alpha$, with each party i having knowledge of the share $a_i=m_i+\alpha_i$. The associated public key to a is $$P_A = aG = P_M + P_\alpha.$$

To generate the next child private key, we follow Step 1 to obtain a new shared secret β, with associated public key $P_\beta=\beta G$. Following this, either we use m or $a=m+\alpha$ as a parent key, giving the option of forming a tree-like key derivation structure:

If we choose m as the parent key, another child private key is $b:=m+\beta$, with public key $P_B=P_M+P_\beta$.

If we choose a as the parent key, its child private key is the secret $a'=a+\beta$ and the corresponding public key is:

$$P_{A'} = P_A + P_\beta.$$

This protocol removes the single point-of-failure, and the tree-like derivation can be used to derive multiple branches for different purposes, such as separate accounts.

The next child key derivation protocols allow participants to derive child keys with different thresholds to their master keys. This can be used to establish different security levels or lower thresholds requiring a smaller number of participants to communicate in order to use the derived keys.

This protocol expands on the JVRSS derivation protocol given above and shows how to derive a new shared secret with a threshold t' from one with a threshold of t, with t'>t. To generate the first child key from the master key m the following steps are executed:

1. Parties generate a shared secret α through the JVRSS protocol of threshold t'. Its associated public key is $P_\alpha = \alpha G$. Each party i has knowledge of their secret share $\alpha_i$ derived from JVRSS.

2. Each party i computes $m_i + \alpha_i$, denoting this value by $\alpha_i$.

The first child private key is then the shared secret $a = m + \alpha$ of threshold $t' > t$. Subsequent child key derivations can be done as described above, with varying thresholds for the generated secrets in Step 1. The maximum threshold is limited by the number of participants, and participants cannot indefinitely increase t' when deriving child keys. Participants may also use the same threshold $t' = t$ to derive some child keys as discussed in Section 3.2. However, if $t' < t$ the threshold of the derived child private key does not change using the protocol above.

The following key derivation protocol uses the fact that multiplicative shares increase the threshold. The steps to derive the first child private key from the master key m are as follows:

1. Parties generate the shared secret a through the JVRSS protocol of threshold t. Each party i has knowledge of their share $\alpha_i$.
2. Each party i computes $m_i \alpha_i$, denoting this value by $a_i$.

The first child private key is then the shared secret $a = m\alpha$ of threshold 2t, with each party i having knowledge of the share $a_i = m_i \alpha_i$. The associated public key to a is $$P_A = aG = \alpha P_M.$$

Due to the multiplicative share $m_i \alpha_i$ computed in Step 2, this protocol increases the threshold from t to 2t. Similarly, we can derive a further child private key b from a such that $b = a\beta$, where $\beta$ is a shared secret generated through the JVRSS protocol of threshold t. Then b has threshold 3t. By repeating this process the number of child keys we can derive is limited by the number of participants.

The following protocol allows us to require 2t+1 participants to collaborate to derive keys of threshold t. The steps of the protocol are as follows:

1. Parties generate shared secrets $\alpha$ and $\beta$ through the JVRSS protocol of threshold t. Each party i computes their secret shares $\alpha_i$ and $\beta_i$.
2. Each party i computes $m_i \alpha_i + \beta_i$, corresponding to the secret $m\alpha + \beta$ of threshold 2t.
3. Party i broadcasts $m_i \alpha_i + \beta_i$ to all the other parties.
4. Parties compute $m\alpha + \beta = \text{interpolate}(m_1\alpha_1 + \beta_1, \ldots, m_{2t+1}\alpha_{2t+1} + \beta_{2t+1})$.
5. Party i computes $a_i = (m\alpha + \beta) - \beta_i$.

The secret shares $a_i$ correspond to the shared secret child private key $a = m\alpha$ of threshold t, with associated public key:

$$P_A = aG = \alpha P_M.$$

The threshold does not increase since the child key a is of threshold t, the same as the master key m, and we can derive as many subsequent keys as necessary. To generate further child keys, participants can opt for either using m as the parent key and repeat steps 1-5 to construct a child private key b, or enable a tree-like structure by using a as the parent key and applying steps 1-5 to obtain a child private key $a' = a\delta$, where $\delta$ is a new JVRSS shared secret.

4. Further Remarks

Other variants or use cases of the disclosed techniques may become apparent to the person skilled in the art once given the disclosure herein. The scope of the disclosure is not limited by the described embodiments but only by the accompanying claims.

It will be appreciated that the above embodiments have been described by way of example only. More generally there may be provided a method, apparatus or program in accordance with any one or more of the following Statements.

Statement 1. A computer-implemented method of generating a share of a shared private key, wherein each participant of a group of participants has a respective share of a master private key, and wherein the method is performed by a first participant of the group and comprises:

generating a first share of a first shared secret, wherein each other participant of the group generates a respective share of the first shared secret; and generating a first share of a first shared private key based on a first share of the master private key and the first share of the first shared secret.

Statement 2. The method of statement 1, wherein each participant has a master public key corresponding to the master private key, and wherein the method comprises:

generating a public key corresponding to the first shared secret; and generating a first public key corresponding to the first shared private key based on the master public key and the public key corresponding to the first shared secret.

Statement 3. The method of statement 1 or statement 2, comprising:

generating a first share of a second shared secret, wherein each other participant of the group generates a respective share of the second shared secret; and generating a first share of a second shared private key based on the first share of the master private key and the first share of the second shared secret.

Statement 4. The method of any preceding statement, comprising:

generating a first share of a third shared secret, wherein each other participant of the group generates a respective share of the third shared secret; and generating a first share of a third shared private key based on the first share of the first private key and the first share of the third shared secret.

Statement 5. The method of statement 2 and statement 4, comprising:

generating a public key corresponding to the third shared secret; and generating a third public key corresponding to the third shared private key based on the first public key and the public key corresponding to the third shared secret.

Statement 6. The method of any preceding statement, wherein the first share of the first shared private key is generated based on an addition of the first share of the master private key and the first share of the first shared secret.

Statement 7. The method of any preceding statement, wherein the first share of the first shared private key is generated based on a multiplication of the first share of the master private key and the first share of the first shared secret.

Statement 8. The method of any of statements 1 to 7, wherein a respective threshold of the master private key is the same as a respective threshold of the first shared secret.

Statement 9. The method of any of statements 1 to 7, wherein a respective threshold of the master private key is higher than a respective threshold of the first shared secret.

Statement 10. The method of any of statements 1 to 7, wherein a respective threshold of the master private key is less than a respective threshold of the first shared secret.

Statement 11. The method of any preceding statement, comprising:

obtaining a message; and generating a first share of a digital signature based on the first share of the first shared private key and the message.

Statement 12. The method of statement 1, comprising:

generating a first share of a fourth shared secret, wherein each other participant of the group generates a respective share of the fourth shared secret, wherein the first shared private key is an intermediate private key, and wherein the first share of the intermediate private key is further based on the first share of the fourth shared secret;

making the first share of the intermediate private key available to each other participant of the group;

receiving a respective share of the intermediate private key from each other respective participant;

generating the intermediate private key based on the first share of the intermediate private key and the received respective shares of the intermediate private key; and generating a first share of a fourth private key based on the intermediate private key and the first share of the fourth shared secret.

Statement 13. The method of statement 12, wherein each of the master private key, the first shared secret and the fourth shared secret have the same threshold.

Statement 14. The method of statement 12 and statement 13, wherein the first share of the intermediate private key is generated based on a multiplication of the first share of the master private key and the first share of the first shared secret, therefore resulting in the intermediate private key having a higher threshold than the master private key.

Statement 15. The method of any preceding statement, comprising:

obtaining a message; and generating a first share of a digital signature based on the first share of the fourth shared private key and the message.

Statement 16. The method of statement 10 or statement 14, wherein the message comprises at least part of a blockchain transaction.

Statement 17. Computer equipment comprising:

memory comprising one or more memory units; and processing apparatus comprising one or more processing units, wherein the memory stores code arranged to run on the processing apparatus, the code being configured so as when on the processing apparatus to perform the method of any of statements 1 to 16.

Statement 18. A computer program embodied on computer-readable storage and configured so as, when run on one or more processors, to perform the method of any of statements 1 to 16.

According to another aspect disclosed herein, there may be provided a method comprising the actions of the coordinating party and the first participant.

According to another aspect disclosed herein, there may be provided a system comprising the computer equipment of the coordinating party and the first participant.

The invention claimed is:

1. A computer-implemented method of generating a share of a shared private key, wherein each participant of a group of participants has a respective share of a master private key, and wherein the method is performed by a first participant of the group and comprises:

coordinating with other participants in the group to generate a first share of a first shared secret using a secret sharing scheme, wherein each other participant of the group generates a respective share of the first shared secret;

generating a first share of a first shared private key based on a first share of the master private key and the first share of the first shared secret;

obtaining a message; and generating a first share of a cryptographic digital signature by inputting the first share of the first shared private key and the message to a cryptographic digital signature algorithm and executing the cryptographic digital signature algorithm.

2. The method of claim 1, wherein each participant has a master public key corresponding to the master private key, and wherein the method comprises:

generating a public key corresponding to the first shared secret; and generating a first public key corresponding to the first shared private key based on the master public key and the public key corresponding to the first shared secret.

3. The method of claim 1, comprising:

generating a first share of a second shared secret, wherein each other participant of the group generates a respective share of the second shared secret; and generating a first share of a second shared private key based on the first share of the master private key and the first share of the second shared secret.

4. The method of claim 1, comprising:

generating a first share of a third shared secret, wherein each other participant of the group generates a respective share of the third shared secret; and generating a first share of a third shared private key based on the first share of the first private key and the first share of the third shared secret.

5. The method of claim 2, comprising:

generating a first share of a third shared secret, wherein each other participant of the group generates a respective share of the third shared secret;

generating a first share of a third shared private key based on the first share of the first private key and the first share of the third shared secret;

generating a public key corresponding to the third shared secret; and generating a third public key corresponding to the third shared private key based on the first public key and the public key corresponding to the third shared secret.

6. The method of claim 1, wherein the first share of the first shared private key is generated based on an elliptic curve addition of the first share of the master private key and the first share of the first shared secret.

7. The method of claim 1, wherein the first share of the first shared private key is generated based on an elliptic curve multiplication of the first share of the master private key and the first share of the first shared secret.

8. The method of claim 1, wherein a respective threshold of the master private key is the same as a respective threshold of the first shared secret.

9. The method of claim 1, wherein a respective threshold of the master private key is higher than a respective threshold of the first shared secret.

10. The method of claim 1, wherein a respective threshold of the master private key is less than a respective threshold of the first shared secret.

11. The method of claim 1, comprising:

generating a first share of a fourth shared secret, wherein each other participant of the group generates a respective share of the fourth shared secret, wherein the first shared private key is an intermediate private key, and wherein the first share of the intermediate private key is further based on the first share of the fourth shared secret;

making the first share of the intermediate private key available to each other participant of the group;

receiving a respective share of the intermediate private key from each other respective participant;

generating the intermediate private key based on the first share of the intermediate private key and the received respective shares of the intermediate private key; and generating a first share of a fourth private key based on the intermediate private key and the first share of the fourth shared secret.

12. The method of claim 11, wherein each of the master private key, the first shared secret and the fourth shared secret have the same threshold.

13. The method of claim 11, wherein each of the master private key, the first shared secret and the fourth shared secret have the same threshold, wherein the first share of the intermediate private key is generated based on a multiplication of the first share of the master private key and the first share of the first shared secret, therefore resulting in the intermediate private key having a higher threshold than the master private key.

14. The method of claim 11, comprising:

obtaining a message; and generating a first share of a digital signature based on the first share of the fourth shared private key and the message.

15. The method of claim 1, wherein the message comprises at least part of a blockchain transaction.

16. A computing device, comprising:

memory comprising one or more memory units; and processing apparatus comprising one or more processing units, wherein the memory stores code arranged to run on the processing apparatus, the code being configured so as when run on the processing apparatus, the processing apparatus performs a method of generating a share of a shared private key, wherein each participant of a group of participants has a respective share of a master private key, and wherein the method is performed by a first participant of the group and comprises:

coordinating with other participants in the group to generate a first share of a first shared secret using a secret sharing scheme, wherein each other participant of the group generates a respective share of the first shared secret;

generating a first share of a first shared private key based on a first share of the master private key and the first share of the first shared secret obtaining a message; and generating a first share of a cryptographic digital signature by inputting the first share of the first shared private key and the message to a cryptographic digital signature algorithm and executing the cryptographic digital signature algorithm.

17. A computer program embodied on non-transitory computer-readable storage media and configured so as, when run on one or more processors, the one or more processors perform a method of generating a share of a shared private key, wherein each participant of a group of participants has a respective share of a master private key, and wherein the method is performed by a first participant of the group and comprises:

coordinating with other participants in the group to generate a first share of a first shared secret using a secret sharing scheme, wherein each other participant of the group generates a respective share of the first shared secret;

generating a first share of a first shared private key based on a first share of the master private key and the first share of the first shared secret;

obtaining a message; and generating a first share of a cryptographic digital signature by inputting the first share of the first shared private key and the message to a cryptographic digital signature algorithm and executing the cryptographic digital signature algorithm.

* * * * *